United States Patent
Hoover

(10) Patent No.: US 12,504,829 B2
(45) Date of Patent: Dec. 23, 2025

(54) CASE WITH INPUT FOR ELECTRONIC DEVICE

(71) Applicant: Apple Inc., Cupertino, CA (US)

(72) Inventor: Joshua A. Hoover, Boulder, CO (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 18/789,305

(22) Filed: Jul. 30, 2024

(65) Prior Publication Data

US 2024/0393888 A1 Nov. 28, 2024

Related U.S. Application Data

(63) Continuation of application No. 18/115,571, filed on Feb. 28, 2023, now Pat. No. 12,093,468.

(51) Int. Cl.
   *G06F 3/02* (2006.01)
   *G06F 1/16* (2006.01)
   *G06F 3/044* (2006.01)
   *H04M 1/02* (2006.01)

(52) U.S. Cl.
   CPC .............. *G06F 3/02* (2013.01); *G06F 1/1628* (2013.01); *G06F 3/044* (2013.01); *H04M 1/026* (2013.01); *G06F 2200/1633* (2013.01)

(58) Field of Classification Search
   CPC ........ G06F 3/1423; G06F 3/0488; G06F 3/02; G06F 1/1628; G06F 3/044; G06F 2200/1633; G06F 1/1684; G06F 1/1626; G06F 3/041; H04B 1/3888; H04M 1/026; G06V 40/1306; A45C 11/00; A45C 11/002; H04W 4/80
   See application file for complete search history.

(56) References Cited

U.S. PATENT DOCUMENTS

| | | | |
|---|---|---|---|
| 6,177,926 B1 | 1/2001 | Kunert | |
| 7,612,997 B1 | 11/2009 | Diebel et al. | |
| 2009/0169977 A1 | 7/2009 | Sfarzo et al. | |
| 2011/0312349 A1 | 12/2011 | Forutanpour et al. | |
| 2013/0154914 A1* | 6/2013 | Salo | H04M 1/72409 361/679.01 |
| 2015/0186093 A1 | 7/2015 | Kim | |
| 2017/0038793 A1 | 2/2017 | Kallman et al. | |
| 2018/0139857 A1* | 5/2018 | Cavenagh | H05K 5/0086 |

(Continued)

FOREIGN PATENT DOCUMENTS

| | | |
|---|---|---|
| CN | 207754725 U | 8/2018 |
| CN | 110968200 A | 4/2020 |
| JP | 2022-036337 A | 3/2025 |

OTHER PUBLICATIONS

Koren Patent Application No. 10-2024-0027937, Office Action dated Jun. 4, 2025, 21 pages with English translation.

*Primary Examiner* — Sahlu Okebato
(74) *Attorney, Agent, or Firm* — BAKERHOSTETLER

(57) ABSTRACT

Input mechanisms can employ a case for an electronic device that provides input capabilities to enhance the user experience when using the case in concert with the electronic device. For example, a case can provide an electromechanical touch sensor to provide the user with an input mechanism that does not require actuation of the button of the electronic device. The electronic device, upon detecting the presence of the case, can disable one or more buttons and perform actions corresponding to the buttons when signals are received from the case.

20 Claims, 9 Drawing Sheets

(56) References Cited

U.S. PATENT DOCUMENTS

| | | | |
|---|---|---|---|
| 2019/0341958 A1* | 11/2019 | Coverstone | H04M 19/04 |
| 2020/0233536 A1 | 7/2020 | Hong | |
| 2022/0197581 A1 | 6/2022 | Lee | |
| 2024/0214488 A1* | 6/2024 | Coverstone | H04B 1/3888 |

* cited by examiner

CASE WITH INPUT FOR ELECTRONIC DEVICE

CROSS REFERENCE TO RELATED APPLICATIONS

This application is a continuation of U.S. patent application Ser. No. 18/115,571, entitled "Case With Input For Electronic Device," filed on Feb. 28, 2023, the disclosure of which is hereby incorporated herein in its entirety.

TECHNICAL FIELD

The present description relates generally to input mechanisms for electronic devices and, more particularly, to input mechanisms on a case that act as inputs for an electronic device.

BACKGROUND

Many types of electronic devices utilize input devices to receive user inputs from users. For example, smartphones, laptop computers, and wearable electronic devices (e.g., smartwatches) may include buttons, switches, touchpads, dials, and the like. Mechanical input devices may include mechanical components and electrical components. For example, a conventional push-button may include a moveable button portion, biasing springs, and mechanical interlocks to retain the button portion to the electronic device, as well as circuit elements (e.g., electrical contacts) that provide an electrical contact closure when the button is pressed. Input devices provide mechanisms by which a user can interact with and control the operation of an electronic device.

BRIEF DESCRIPTION OF THE DRAWINGS

Certain features of the subject technology are set forth in the appended claims. However, for purpose of explanation, several embodiments of the subject technology are set forth in the following figures.

DETAILED DESCRIPTION

Figure 1:
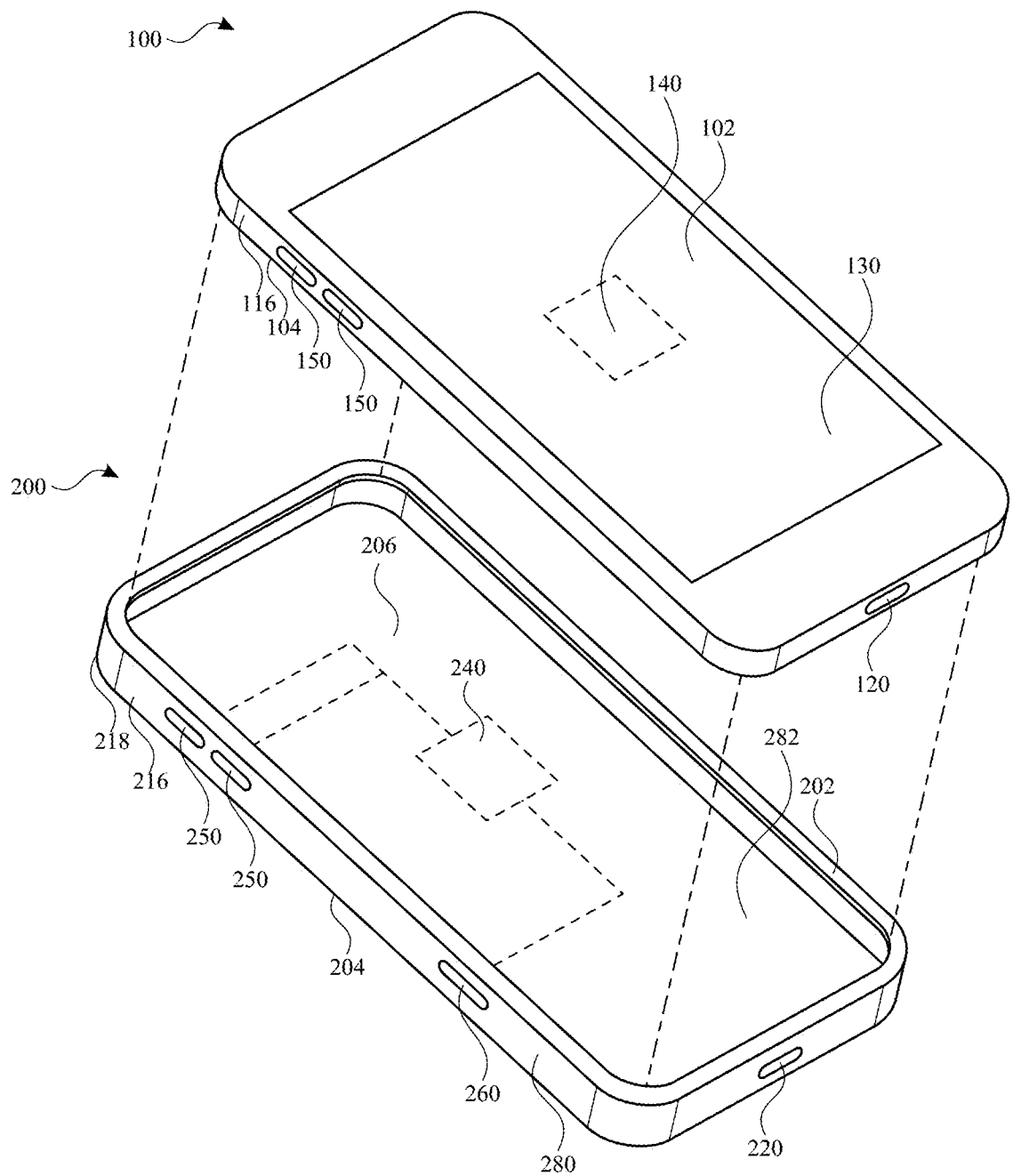
FIG. 1 shows an isometric view of an electronic device and a case for the electronic device, in accordance with one or more implementations of the subject technology.

The detailed description set forth below is intended as a description of various configurations of the subject technology and is not intended to represent the only configurations in which the subject technology may be practiced. The appended drawings are incorporated herein and constitute a part of the detailed description. The detailed description includes specific details for the purpose of providing a thorough understanding of the subject technology. However, it will be clear and apparent to those skilled in the art that the subject technology is not limited to the specific details set forth herein and may be practiced without these specific details. In some instances, well-known structures and components are shown in block diagram form in order to avoid obscuring the concepts of the subject technology.

The present disclosure relates to input mechanisms. For example, an electronic device (e.g., smartphone or tablet) and a case for an electronic device may include separate input mechanisms that cause the electronic device to perform actions based on whether or not the case is coupled to the electronic device.

When a case is installed on an electronic device (e.g., smartphone or tablet), the case can include a region that corresponds to the buttons of the electronic device. The purpose of such case regions can be to indicate to a user where pressure can be applied to actuate the button of the electronic device through the case. However, if such regions of the case are loosely fitted, then an air gap may form between the case and the button of the electronic device. This can cause an amount of travel to be required before pressure from the user begins to engage the button of the electronic device, thereby causing the user to experience the button as if it had poor tactility.

With some cases, the regions thereof corresponding to the buttons of the electronic device can be pre-loaded with forces against the buttons to eliminate or reduce such air gaps. This can prevent the user from feeling air gap between the case and button, which can improve the button tactility. However, some buttons are highly sensitive, and certain magnitudes of pre-load can unintentionally trigger the button of the electronic device.

Input mechanisms disclosed herein can employ a case for an electronic device that provides input capabilities to enhance the user experience when using the case in concert with the electronic device. For example, a case can provide a capacitive touch sensor to provide the user with an input mechanism that does not require actuation of the button of the electronic device. The electronic device, upon detecting the presence of the case, can disable one or more buttons and perform actions corresponding to the buttons when signals are received from the case.

These and other embodiments are discussed below with reference to FIGS. 1-15. However, those skilled in the art will readily appreciate that the detailed description given herein with respect to these Figures is for explanatory purposes only and should not be construed as limiting.

FIG. 1 depicts an exemplary electronic device 100 and an exemplary case 200 for electronic device 100. As described herein, either or both of electronic device 100 and case 200 may include input regions to provide an ability to receive inputs from a user whether or not the case is coupled to the electronic device.

Electronic device 100 can define a front side 102 and a rear side 104, opposite front side 102. Electronic device 100 can include a display 130 on front side 102 for viewing image-based content. Additionally, electronic device 100 can include one or more input features on front side 102 for receiving touch-based inputs from a user. Electronic device 100 a connection interface 120 that provides data and/or power communications between electronic device 100 and another device. The communication interface may be wired or wireless. Electronic device 100 can include internal components, such as processors, memory, circuit boards, batteries, sensors, and the like. Exemplary components of electronic device 100, and their functions, are described with respect to FIG. 15.

Electronic device 100 may include one or more buttons to be operated as control inputs designed to provide a command to electronic device 100. For example, electronic device 100 may include one or more buttons 150 positioned along sidewall 116. The aforementioned buttons 150 may be used to adjust the visual information presented on display 130 or the volume of acoustical energy output by an audio speaker, as non-limiting examples. Buttons 150 may include one of a switch or a protrusion designed to generate a command to a processor circuit. Buttons 150 may at least partially extend through openings in sidewall 116. Additionally or alternatively, buttons 150 and/or one or more other buttons can be positioned on any region of electronic device 100, such as front side 102 and/or rear side 104. One or more of buttons 150 can be covered by case 200 when electronic device 100 is coupled to case 200, as described further herein.

Electronic device 100 may include a device communication interface 140 for communicating with case 200 and/or another device using any suitable communications protocol. In some embodiments, device communication interface 140 of electronic device 100 can support wireless data transfer between devices, for instance to allow different cases 200 to identify themselves. Accordingly, in some embodiments, device communication interface 140 can include a near-field communication (NFC) coil at or near a rear side 104 of electronic device 100. An NFC reader circuit and/or other components (not shown) can connect to termination ends of the NFC coil. In some embodiments, device communication interface 140 can include a physical interface for communicating with case 200 via a physical contact (e.g., electrically conductive contacts, electrodes, signal lines, pogo pins, wires, and the like).

Case 200 may be any device that couples to electronic device 100 and facilitates use therewith. Case 200 may define or include an interior cavity 206 for receiving and retaining at least a rear side 104 of electronic device 100. Case 200 can be an accessory (or auxiliary device) that is used with electronic device 100 to protect, enhance, and/or supplement the aesthetics and/or functions of electronic device 100. For example, case 200 can be a protective case, an external battery, a camera attachment, or the like.

Case 200 can define a front side 202 and a rear side 204, opposite front side 202. A body 218 of case 200 can receive at least rear side 104 of electronic device 100 through at least front side 202 of case 200. For example, body 218 of case 200 can provide an interior cavity 206 into which a portion or the entirety of electronic device 100 may be placed. Interior cavity 206 may be defined, at least in part, by sidewalls 216 of body 218 that surround some portion of electronic device 100 (e.g., exterior surfaces). In one example, sidewalls 116 can be between front side 202 and rear side 204 of case 200 and can extend about an entire periphery of electronic device 100 that is between front side 102 and rear side 104 of electronic device 100, for example, sidewalls 116 of electronic device 100. Interior cavity 206 may be further defined, at least in part, by a portion of body 218 that provides a surface along rear side 204 of case 200. Interior cavity 206 may also include one or more retention features for holding and securing electronic device 100 within interior cavity 206. The retention features may include rails, channels, snaps, detents, latches, catches, magnets, friction couplings, doors, locks, flexures, and the like. It will be understood that coupling between case 200 and electronic device 100 can be secure, such that case 200 and electronic device 100 are not inadvertently separated during use. It will be further understood that case 200 and electronic device 100 can be removably coupled, such that electronic device 100 can be removed from case 200 as desired by a user. As such, the coupling between case 200 and electronic device 100 can be reversible, such that each can be restored to a state prior to any coupling there between.

Case 200 can include a connector and/or opening 220 that mates with and/or allows access to connection interface 120 of electronic device 100 when electronic device 100 is placed within interior cavity 206. For example, an opening can extend through sidewall 216 and/or another portion of case 200 to allow access to connection interface 120 by another device. Additionally or alternatively, a connector can be provided by case 200 to mate with connection interface 120 for operative communication between case 200 and electronic device 100.

Case 200 may include one or more touch sensors 250 and/or 260 to be operated as control inputs designed to provide a command to electronic device 100 via case 200. For example, case 200 may include one or more touch sensors 250 and/or 260 positioned along sidewall 216. Additionally or alternatively, one or more other touch sensors can be positioned on any region of case 200, such as front side 202 and/or rear side 204. Touch sensors 250 can be positioned to overlap one or more buttons 150 of electronic device 100 when case 200 is coupled to electronic device 100. As such, touch sensors 250 can be operated as a substitute for buttons 150, as described further herein. Additionally or alternatively, one or more touch sensors 260 can be provided at locations such that the one or more touch sensors 260 do not overlap any buttons 150 of electronic device 100. Such touch sensors 260 can be operated as a supplement to buttons 150, as described further herein. A touch sensor 260 of case 200 can include one or more of any features described herein with respect to touch sensors 250.

Case 200 can include multiple constituent parts to provide different features at different regions thereof. For example, case 200 can include a body 218 that defines a shape of case 200. Body 218 of case 200 may be a unitary, monolithic structure formed from an elastomeric material, such as silicone, thermoplastic polyurethane, or any other appropriate material. Alternatively, body 218 may be formed from multiple discrete parts (of the same or different materials). For example, rear side 204 of case 200 may be formed from an elastomeric material, while other portions of case 200 (e.g., sidewalls 216) may be formed from a rigid material.

As shown in FIG. 1, additional layers can optionally be provided to body 218. Body 218 can include or be coupled to an outer layer 280 for contact by the user and an inner layer 282 that contacts rear housing of electronic device 100. Inner layer 282 can be of a material for gently contacting electronic device 100. For example, inner layer 282 can include microfiber, another fabric, foam, rubber, and the like. Inner layer 282 can be selected for dissipating heat and/or avoiding damage to electronic device 100. Outer layer 280 can be of a material for contact by the user. For example, outer layer 280 can include plastic, rubber, silicone, leather, and/or other materials. In some embodiments, body 218, inner layer 282, and/or outer layer 280 can be opaque and a case communication interface 240 and/or other components embedded within body 218 and/or otherwise between inner layer 282 and outer layer 280 need not be visible to a user.

Case 200 may include a case communication interface 240 for communicating with electronic device 100 and/or another device using any suitable communications protocol. In some embodiments, case communication interface 240 of case 200 can support wireless data transfer between devices, for instance to allow case 200 to identify itself to different electronic devices 100. Accordingly, in some embodiments, case communication interface 240 can include a near-field communication (NFC) coil at or near rear side 204 of case 200. An NFC reader circuit and/or other components (not shown) can connect to a passive NFC tag that can be read by a suitably configured NFC reader (e.g., device communication interface 140 of electronic device 100). In some embodiments, case communication interface 240 can include a physical interface for communicating with electronic device 100 via a physical contact (e.g., electrically conductive contacts, electrodes, signal lines, pogo pins, wires, and the like). For example, case communication interface 240 can connect to connection interface 120 and/or another physical connector of electronic device 100.

In some embodiments, case 200 can include one or more wireless charging coils (not shown). For example, case 200 can be a portable external battery pack that can be attached to and carried together with electronic device 100. In some embodiments, case 200 can operate a wireless charging coil as a receiver coil to charge its onboard battery or as a transmitter coil to provide power to electronic device 100. In some embodiments, case 200 can include separate transmitter and receiver coils. Case 200 can operate coil(s) to transmit power or to receive and store power depending on current conditions. In still other embodiments, case 200 can be an "unpowered" or "passive" accessory such as a case that contains no active circuitry, and a wireless charging coil can be omitted. In such cases, case 200 can be designed not to inhibit wireless power transfer between a wireless charging device and electronic device 100. For instance, relevant portions of case 200 can be made of a material such as plastic, leather, or other material that is transparent to a time-varying magnetic flux.

Figure 2:
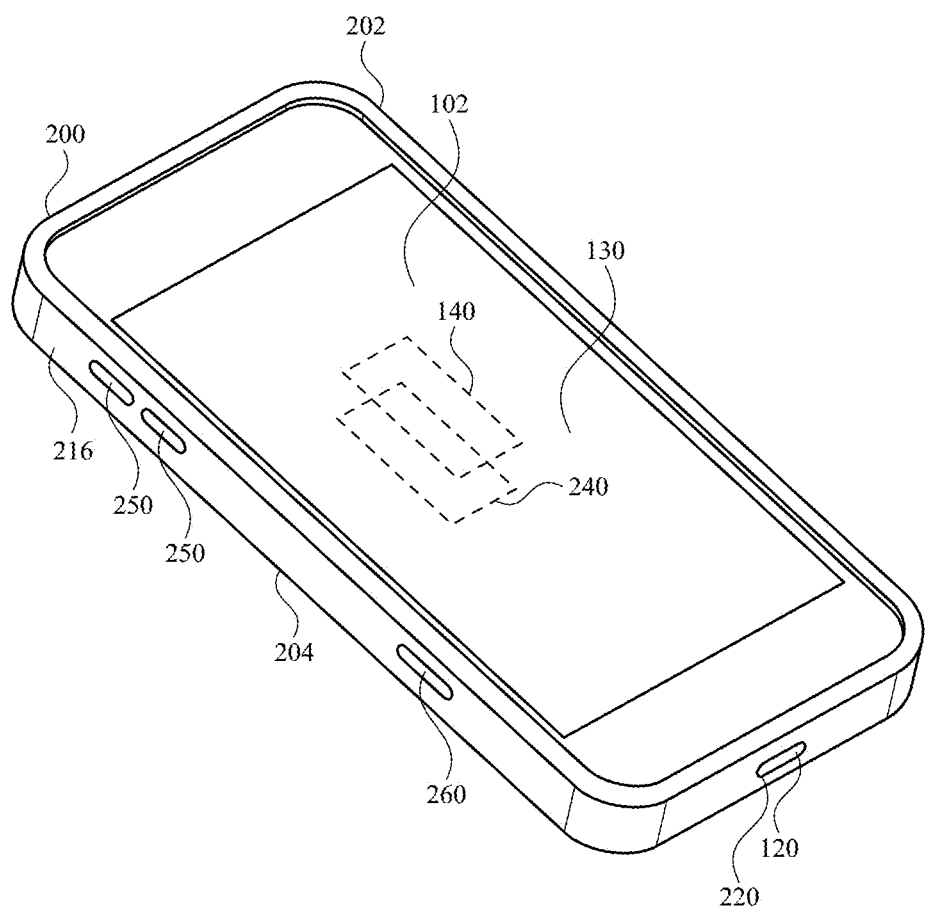
FIG. 2 shows an isometric view of the electronic device and the case of FIG. 1 coupled together, in accordance with one or more implementations of the subject technology.

FIG. 2 depicts electronic device 100 disposed within case 200. Opening 220 is positioned to provide access to connection interface 120. Device communication interface 140 and case communication interface 240 can be aligned to provided operative communication (e.g., NFC, other wireless communication, and/or physical contact) between case 200 and electronic device 100.

Case 200 and electronic device 100 can be separate devices that are temporarily and securely coupled together to form an integrated unit. Electronic device 100 can be a device that is capable of operating independently of and/or in concert with case 200. For example, electronic device 100 may be a handheld or otherwise electronic device such as a smartphone, a portable media player, an internet-capable device, a personal digital assistant ("PDA"), any other electronic device, or any combination thereof. Electronic device 100 may be configured to provide specific features and/or applications for use by a user. Electronic device 100 may be a lightweight and small form factor device so that it can easily be supported on a user's head. It will be understood that electronic device 100 may be embodied in a variety of forms including a variety of features, all or some of which can be utilized by case 200 (e.g., input/output, controls, processing, battery, etc.).

While FIGS. 1-2 show a smartphone and a smartphone case, these are merely examples of devices or components that may include input mechanisms. Other possible devices include, without limitation, smartwatches, laptop computers, tablet computers, input accessories (e.g., mice, keyboards, touchpads), home appliances, remote controls, and the like, as well as cases and/or accessories for such devices.

Figure 3:
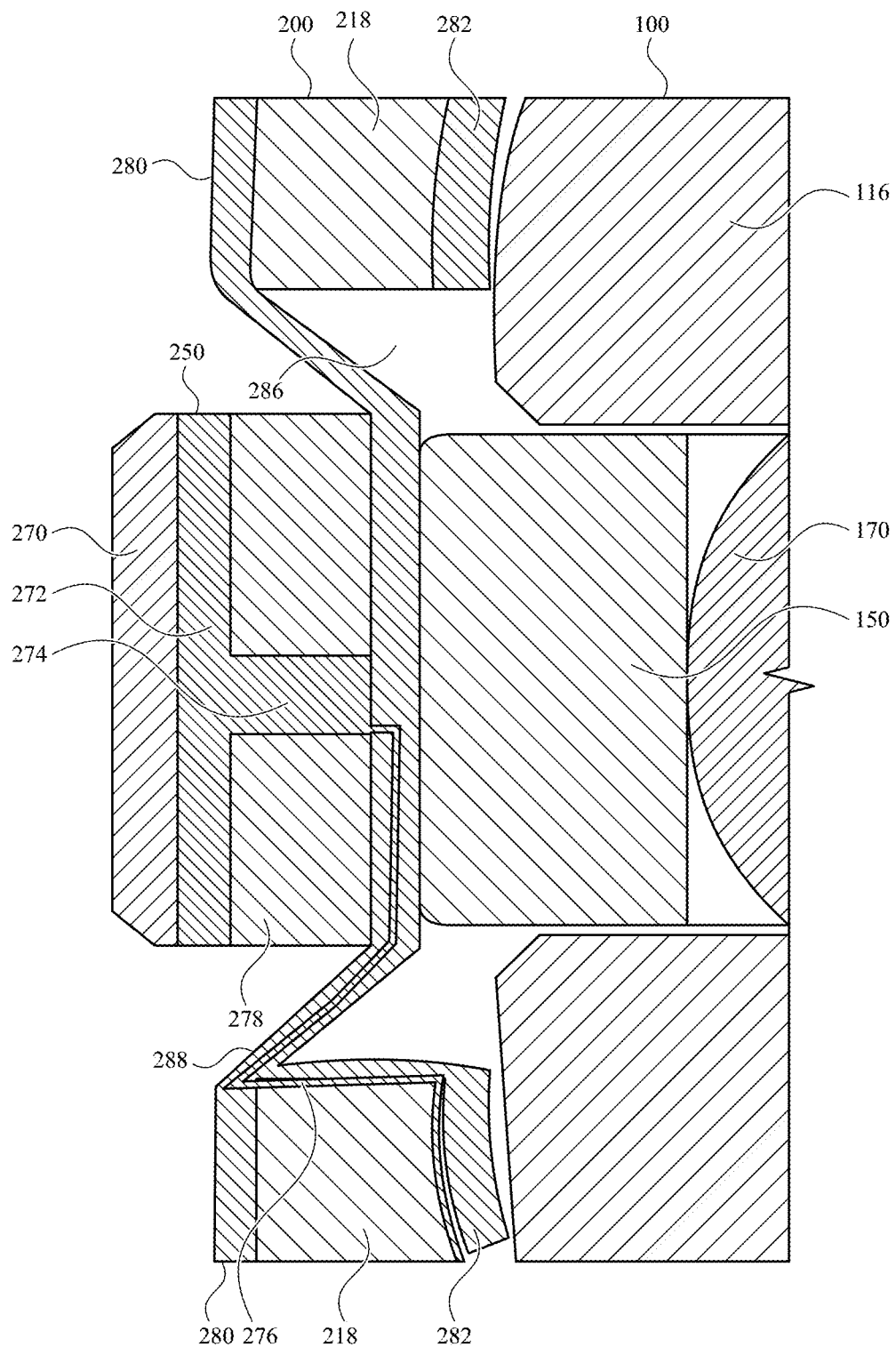
FIG. 3 shows a sectional view of a portion of an electronic device and a case, in accordance with one or more implementations of the subject technology.

FIG. 3 shows a sectional view of a portion of an electronic device and a case, in accordance with one or more implementations of the subject technology. As shown in FIG. 3, electronic device 100 can include button 150 and case 200 can include touch sensor 250.

Button 150 of electronic device 100 can be actuated by a user to detect inputs. For example, button 150 can move within sidewall 116 of electronic device 100. Movement or other actuation of button 150 can be detected by a button sensor 170 of electronic device 100. Button sensor 170 can include one or more mechanisms, such as strain gauges, dome switches, and the like. In some embodiments, button sensor 170 can produce a signal upon detection of actuation and/or other movement of button 150. It will be understood that the signal generated by button sensor 170 can include a binary signal and/or other signal, such as a signal that indicates a magnitude of pressure or force applied to button 150. Such a signal can be a basis for determining whether button 150 is being pressed and/or how button 150 is being pressed. Such results can be compared to thresholds or other criteria for determining whether an action is to be performed by electronic device 100. In some embodiments, electronic device 100 can perform an action corresponding to button 150, such that inputs at button 150 can be interpreted as a command by the user to perform the action.

Case 200 can include a touch sensor 250. Touch sensor 250 can overlap button 150 when case 200 is coupled to electronic device 100. In some embodiments, touch sensor 250 can be supported on a portion 288 of outer layer 280 and/or inner layer 282 that overlaps an opening 286 of the case. Opening 286 can extend through body 218 and/or one or more layers of case 200. Opening 286 can overlap button 150 of electronic device 100 to allow touch sensor 250 to rest against button 150. Portion 288 of outer layer 280 and/or inner layer 282 can be biased to extend into opening 286. For example, outer layer 280 and/or inner layer 282 can provide resilience to bias inwardly toward button 150. Touch sensor 250 can extend outwardly from portion 288. In some embodiments, touch sensor 250 can extend beyond the surface of outer layer 280.

Touch sensor 250 can include a substrate 278. Substrate 278 can form a relatively rigid structure for supporting other components of touch sensor 250. While substrate 278 is shown on an outer side of outer layer 280, it will be understood that portions of substrate 278 and/or other supporting structure can be provided on an inner side of outer layer 280 and/or other portions of case 200. Touch sensor 250 can further include a button cap 270 at an outer surface thereof. Touch sensor 250 can further include a capacitive touch sensor 272 between button cap 270 and substrate 278. Capacitive touch sensor 272 can optionally include a self-capacitance sensor. Optionally, capacitive touch sensor 272 can include multiple sensing elements, such as conductive electrodes, to detect contact and changes in contact at multiple locations. Capacitive touch sensor 272 can include one or more conductive portions defining sensing elements and/or grounded regions for detecting capacitance and changes to capacitance there between.

In some embodiments, touch sensor 250 can include one or more electromechanical sensors, capacitive sensors, strain gauges, resistive touch sensors, piezoelectric sensors, optical sensors, ultrasound sensors, thermal sensors, cameras, pressure sensors, photodiodes, and/or other sensors operable to detect a user input comprising contact with touch sensor 250. In some embodiments, touch sensor 250 can detect a mere presence of the user without requiring a force of pressure to be applied. In some embodiments, touch sensor 250 can detect a magnitude of force or pressure applied thereto by a user. In some embodiments, touch sensor 260 can detect a position and/or movement (e.g., direction and speed) of a touch applied thereto by a user.

Touch sensor 250 can further include a via 274 extending through substrate 278 from capacitive touch sensor 272 to a trace 276. Trace 276 can extend from touch sensor 250 to case communication interface 240 of case 200 (not shown in FIG. 3). Trace 276 can extend between one or more portions of case 200. For example, at least a portion of trace 276 can extend between outer layer 280 and inner layer 282. By further example, at least a portion of trace 276 can extend between inner layer 282 and body 218. As such, trace 276 can be concealed and protected within one or more layers of case 200. While touch sensor 250 can be positioned at a sidewall of case 200, trace 276 can provide operative connection to case communication interface 240, which can be optimally positioned to communicate with device communication interface 140 of electronic device 100.

Figure 4:
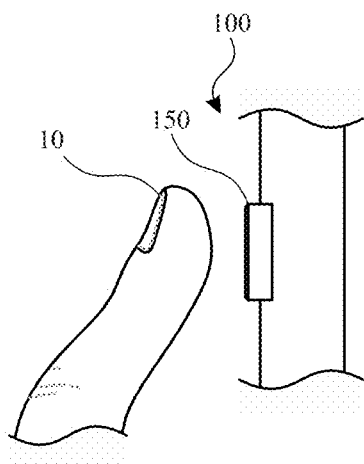
FIG. 4 shows a front view of a portion of an electronic device with a button, in accordance with one or more implementations of the subject technology.
Figure 5:
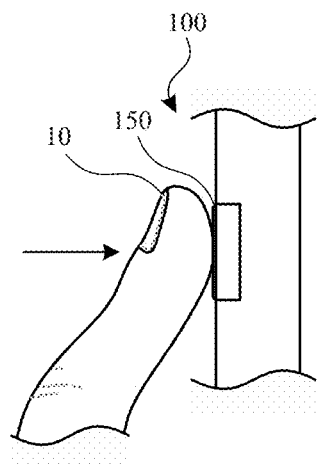
FIG. 5 shows a front view of the portion of the electronic device of FIG. 4 with the button actuated, in accordance with one or more implementations of the subject technology.

Referring now to FIGS. 4 and 5, electronic device 100 can be operated by providing inputs to buttons thereof in the absence of a case. As shown in FIGS. 4 and 5, without a case, button 150 is readily available for direct input from a user 10. As shown in FIG. 4, button 150 can start from a first position in which button 150 is not actuated. As shown in FIG. 5, button 150 can receive an input from a user 10. Upon application of a force or pressure from user 10, button 150 can be actuated. While a certain extent of actuation between FIGS. 4 and 5 is illustrated, it will be understood that the amount of travel experience by button 150 can be any amount of travel. In some embodiments, the amount of travel achieved by button 150 is nominal, such that forces and/or pressure can be detected by button 150 without significant movement.

Figure 6:
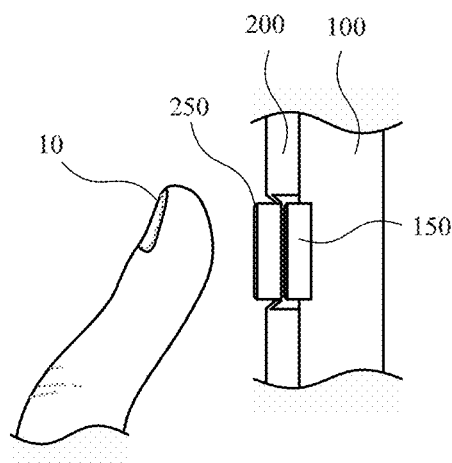
FIG. 6 shows a front view of a portion of an electronic device with a button and a case with a touch sensor, in accordance with one or more implementations of the subject technology.
Figure 7:
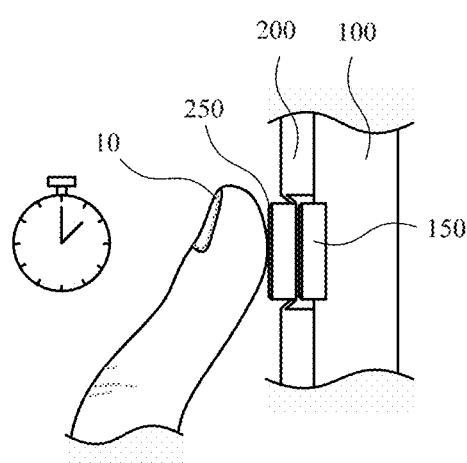
FIG. 7 shows a front view of the portion of the electronic device and the case of FIG. 6 with the touch sensor receiving a touch input, in accordance with one or more implementations of the subject technology.

Referring now to FIGS. 6 and 7, case 200 can be operated by providing inputs to touch sensors 250 thereof for causing corresponding actions to be performed on electronic device 100. As shown in FIG. 6, case 200 can include touch sensor 250. Touch sensor 250 can overlap button 150 when case 200 is coupled to electronic device 100. In some embodiments, case 200 can arrange touch sensor 250 to be preloaded against button 150 with a biasing force to reduce air gaps there between. As such, the preload of touch sensor 250 (i.e., without user input or other external forces) can apply pressure or force to button 150 that may be detectable by button sensor 170. Because such a force is not caused by a user input, it can be advantageous to disable operation of button 150 when the presence of case 200 is detected so that false inputs are rejected.

Rather than requiring operation of button 150 indirectly through case 200, case 200 can provide an alternative mechanism for receiving input from user 10. As shown in FIG. 7, touch sensor 250 can receive inputs independent of the operation of button 150. Touch sensor 250 can be operated based on one or more of various criteria for detecting inputs from a user 10. In some embodiments, touch sensor 250 can detect mere presence of user 10 without requiring a threshold force or pressure to be exceeded. For example, touch sensor 250 can detect a user input as a change in capacitance or other characteristic that is induced in touch sensor 250. By further example, touch sensor 250 can detect a force or pressure associated with the input from user 10. By further example, touch sensor 250 can detect a location, region, area, or other characteristic of the contact between user 10 and touch sensor 250.

In some embodiments, the presence of user 10 can be detected for a duration of time. Where user 10 is detected as being present and/or otherwise interacting with touch sensor 250 for a duration of time, such a duration of time can be compared to a threshold to determine whether the presence is to be interpreted as a user input. Where the presence does exceed a threshold, case 200 and/or electronic device 100 can determine that the presence is to be interpreted as a user input.

In some embodiments, a user input received by touch sensor 250 can be communicated to electronic device 100. Electronic device 100 can perform a corresponding action that is associated with button 150 that is covered by touch sensor 250 of case 200. While button 150 need not have provided the detection and/or may have been disabled while case 200 is present, the operation of touch sensor 250 overlapping a particular button 150 can nonetheless be interpreted as a user input associated with button 150. Accordingly, electronic device 100 can perform an action associated with button 150. For example, in response to a detection by touch sensor 250, electronic device 100 can perform a same action that would be performed had a detection been made by button 150 that is covered by touch sensor 250.

In some embodiments, touch sensor 250 can be used to detect a tap, double tap, triple tap, or another tap gesture by the user. For example, as user 10 applies contact to touch sensor 250, touch sensor 250 can detect the resulting capacitance or other characteristic that is induced in touch sensor 250. User 10 can subsequently release contact, and touch sensor 250 can detect the resulting capacitance or change in capacitance or other characteristic that is induced in touch sensor 250. User 10 can subsequently return to touch sensor 250, and touch sensor 250 can detect the resulting capacitance or change in capacitance that is induced in touch sensor 250. The sequence of inputs within a span of time can be interpreted by touch sensor 250 as a tap gesture from user 10.

It will be understood that a variety of input types and/or combinations thereof can be detected to determine whether a user input is to be interpreted as a user command. It will be understood that the type of user input detected by touch sensor 250 need not be the same type of user input that would be detected by button 150 in order to achieve the same action from electronic device 100.

Figure 8:
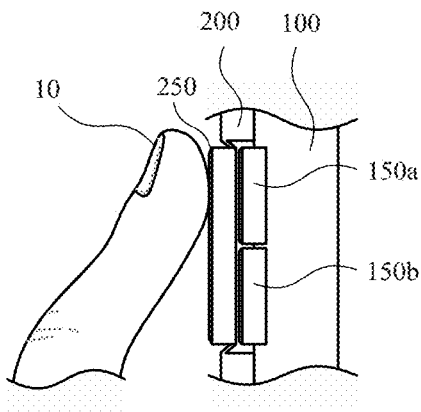
FIG. 8 shows a front view of a portion of an electronic device with buttons and a case with a touch sensor, in accordance with one or more implementations of the subject technology.
Figure 9:
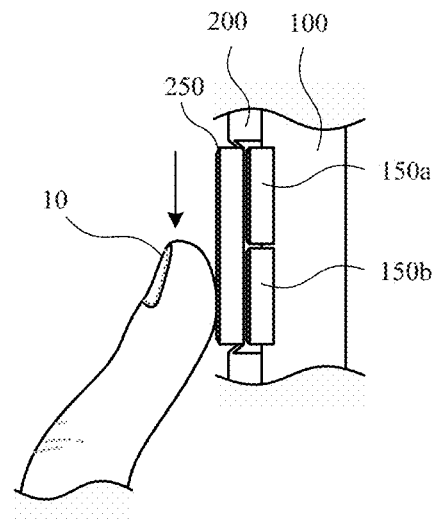
FIG. 9 shows a front view of the portion of the electronic device and the case of FIG. 8 with the touch sensor receiving a sliding input, in accordance with one or more implementations of the subject technology.

Referring now to FIGS. 8 and 9, a case can be operated by providing inputs to touch sensors thereof for causing corresponding actions to be performed on an electronic device. A corresponding action to be performed can be associated with one of multiple buttons 150a and 150b of electronic device 100 that are covered by an operated touch sensor 250 of case 200.

As shown in FIG. 8, case 200 can include touch sensor 250. Touch sensor 250 can overlap multiple buttons 150a and 150b when case 200 is coupled to electronic device 100. Rather than requiring operation of buttons 150a and 150b indirectly through case 200, case 200 can provide an alternative mechanism for receiving input from user 10. As shown in FIG. 9, touch sensor 250 can receive directional (e.g., sliding) inputs independent of the operation of buttons 150a and 150b. For example, touch sensor 250 can be used to detect a sliding gesture by user 10. Multiple sensing elements of touch sensor 250 along a surface thereof can be used in concert to detect particular user inputs. For example, as a user 10 contact at a first part of touch sensor 250 (e.g., overlapping a first button 150a), touch sensor 250 can detect the resulting capacitance that is induced in a corresponding first sensing element of touch sensor 250. User 10 can subsequently move to a second part of touch sensor 250 (e.g., overlapping a second button 150b), and touch sensor 250 can detect the resulting capacitance that is induced in the corresponding second sensing element of touch sensor 250. For longitudinal sliding gestures, the corresponding sensing elements can be those that are distributed over different buttons 150a and 150b. The sequence of inputs within a span of time can be interpreted by touch sensor 250 as a user's motion gesture in a particular direction (e.g., in a direction of one of buttons 150a or 150b). For example, the sequence of (1) a detected capacitance in a first sensing element over a first button 150a and then (2) a detected capacitance in a second sensing element over a second button 150b can be interpreted as a user motion gesture in a first direction toward the first button 150a. By further example, the sequence of (1) a detected capacitance in a second sensing element over the second button 150b and then (2) a detected capacitance in a first sensing element over the first button 150a can be interpreted as a user motion gesture in a second direction toward the second button 150b.

Detected sliding gestures can be correlated with preprogrammed functions to be performed by electronic device 100 and/or an external device upon detection of the sliding gestures. In some embodiments, a user input received by touch sensor 250 can be communicated to electronic device 100. Electronic device 100 can perform a corresponding action that is associated with button 150a or 150b toward which the sliding gesture is directed. While buttons 150a and 150b need not have provided the detection and/or may have been disabled while case 200 is present, the operation of touch sensor 250 overlapping buttons 150a and 150b can nonetheless be interpreted as a user input associated with buttons 150a and 150b. Accordingly, electronic device 100 can perform an action associated with one of buttons 150a and 150b. For example, in response to a detection by touch sensor 250 of a sliding gesture, electronic device 100 can perform a same action that would be performed had a detection been made by button 150a or 150b that is covered by touch sensor 250 and in a direction of the sliding gesture.

Figure 10:
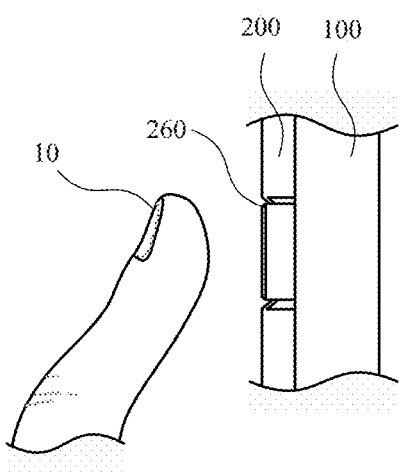
FIG. 10 shows a front view of a portion of an electronic device and a case with a touch sensor, in accordance with one or more implementations of the subject technology.
Figure 11:
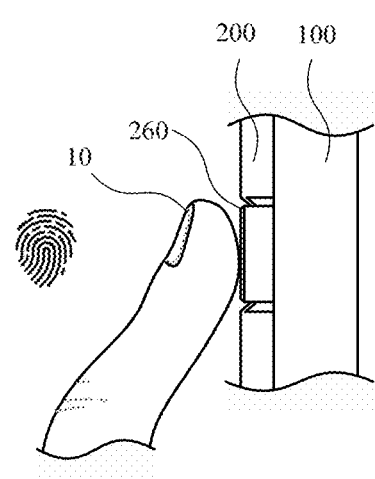
FIG. 11 shows a front view of the portion of the electronic device and the case of FIG. 10 with the touch sensor receiving a touch input, in accordance with one or more implementations of the subject technology.

Referring now to FIGS. 10 and 11, a case can be operated by providing inputs to touch sensors thereof for causing corresponding actions to be performed on an electronic device. A corresponding action to be performed can be one that need not be associated with a button of electronic device 100.

As shown in FIG. 10, case 200 can include touch sensor 260. Touch sensor 260 can overlap a portion of electronic device 100 that lacks a button when case 200 is coupled to electronic device 100. Rather than replacing the function of a button of electronic device 100, case 200 can provide a supplemental mechanism for receiving input from user 10. A touch sensor 260 of case 200 can include one or more of any features described herein with respect to touch sensors 250, including composition, functionality, and methods of detecting inputs from a user 10.

As shown in FIG. 11, touch sensor 260 can receive inputs independent of the operation of any button. Touch sensor 260 can be operated based on one or more of various criteria for detecting inputs from a user 10. In some embodiments, touch sensor 260 can detect mere presence of user 10 without requiring a threshold force or pressure to be exceeded. For example, touch sensor 260 can detect a user input as a change in capacitance or other characteristic that is induced in touch sensor 260. By further example, touch sensor 260 can detect a force or pressure associated with the input from user 10. By further example, touch sensor 260 can detect a location, region, area, or other characteristic of the contact between user 10 and touch sensor 260. In some embodiments, a user input received by touch sensor 260 can be communicated to electronic device 100. Electronic device 100 can perform a corresponding action that is not associated with any button of electronic device 100.

In some embodiments, touch sensor 260 can be a fingerprint sensor. For example, touch sensor 260 can be a capacitive sensor, an optical sensor, an ultrasound sensor, a thermal sensor, and the like to detect features of a finger of user 10. The detection of a fingerprint can serve as an authentication of user 10. For example, the fingerprint detection performed by touch sensor 260 can be transmitted to electronic device 100. If the fingerprint detection is associated with an authorized user of electronic device 100, electronic device 100 can unlock one or more features thereof in response to the detection. To perform authentication, case 200 can transmit the detected features to electronic device 100, and electronic device 100 can determine, based on such detections, whether user 10 is an authorized user. Additionally or alternatively, to perform authentication, case 200 can determine whether the detected features are associated with an authorized user and transmit a signal comprising a command to unlock one or more features of electronic device 100.

Figure 12:
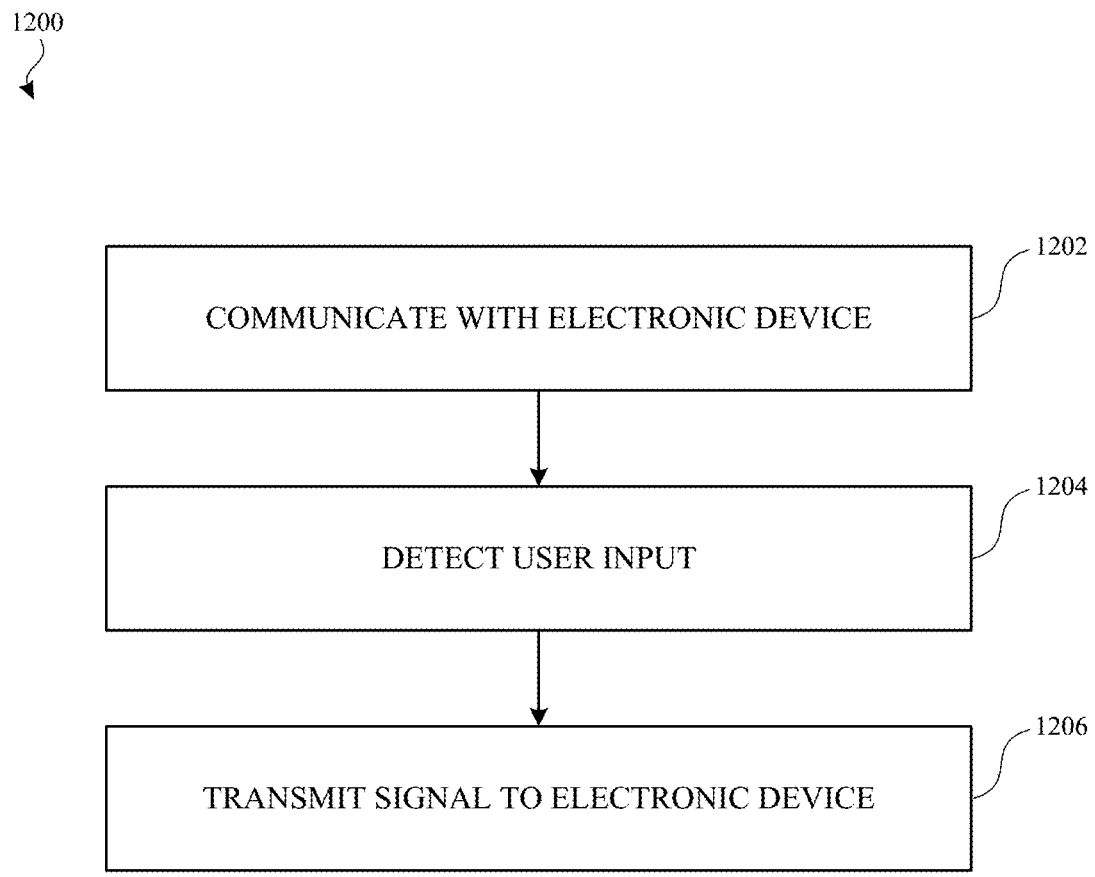
FIG. 12 illustrates a flow chart of example operations that can be performed by a case, in accordance with implementations of the subject technology.

FIG. 12 illustrates a flow chart of example process 1200 with operations that can be performed by a case, in accordance with implementations of the subject technology. For explanatory purposes, process 1200 is primarily described herein with reference to case 200 as shown in FIGS. 1-3 and 6-11. However, process 1200 is not limited to case 200 of FIGS. 1-3 and 6-11, and one or more blocks (or operations) of process 1200 can be performed by one or more other components of other suitable devices or systems. Further for explanatory purposes, some of the blocks of process 1200 are described herein as occurring in serial, or linearly. However, multiple blocks of process 1200 can occur in parallel. In addition, the blocks of process 1200 need not be performed in the order shown and/or one or more blocks of process 1200 need not be performed and/or can be replaced by other operations.

At block 1202, the case can communicate with an electronic device. For example, the case can transmit an identification signal associated with the case to the electronic device. By further example, such an identification signal can be transmitted from the case communication interface to the device communication interface. The identification signal can be associated with an NFC tag of the case or otherwise be used by the electronic device to identify one or more characteristics of the case, such as make, model, serial number, and the like. The electronic device can determine one or more features of the case based on the transmitted identification signal.

At block 1204, the case can detect a user input. For example, a touch sensor of the case can detect a presence of or interaction from a user. Such a detection can include a duration of time for an input, a force or pressure, a motion (e.g., sliding gesture), a location, a fingerprint detection, and the like.

At block 1206, the case can transmit a signal to the electronic device in response to the detection. For example, one or more characteristics of the detection can be transmitted to the electronic device. By further example, processing, conditioning, and/or analysis of the detected input can be performed by the case, and the signal can be a result of such additional operations. Based on the transmitted signal, the electronic device can perform one or more operations, as described further herein.

Figure 13:
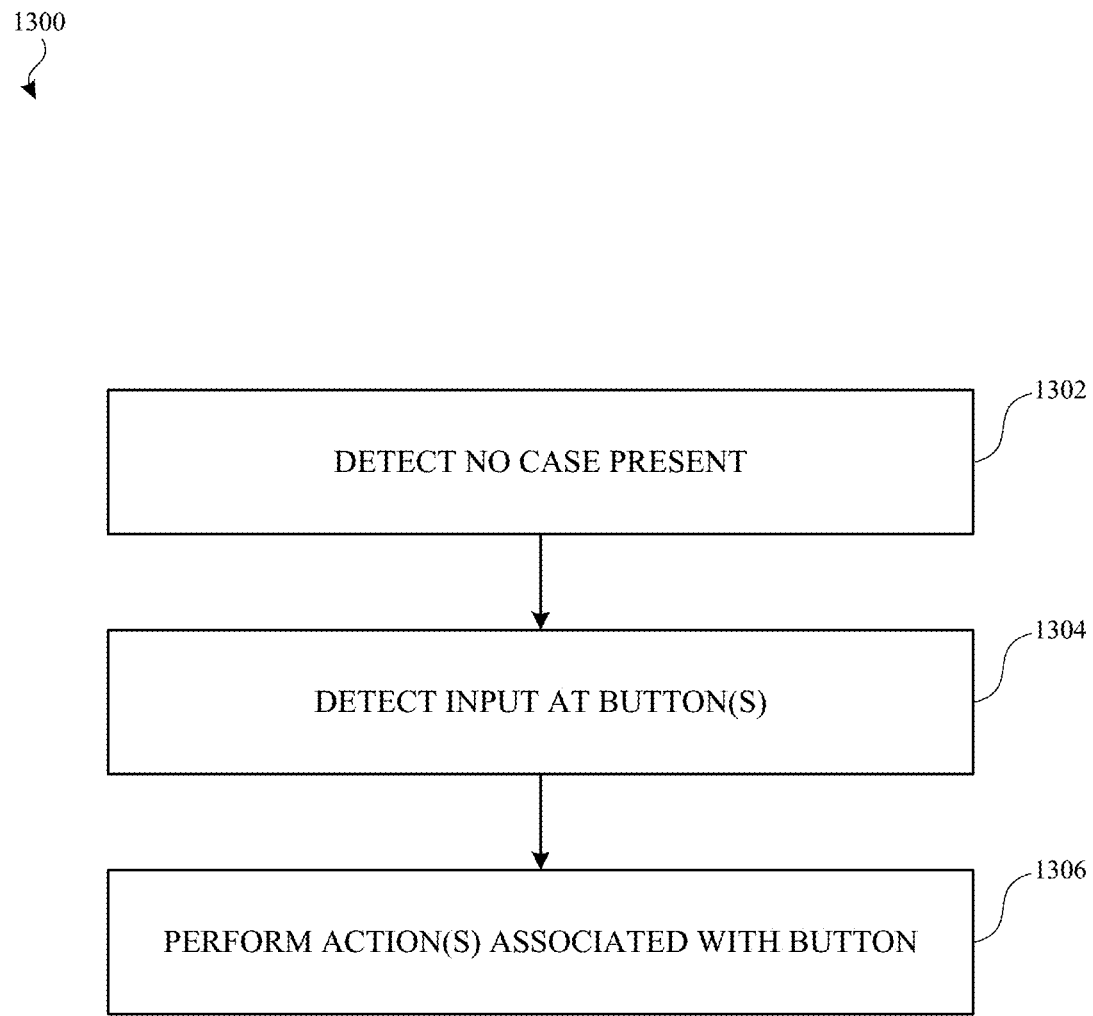
FIG. 13 illustrates a flow chart of example operations that can be performed by an electronic device, in accordance with implementations of the subject technology.

FIG. 13 illustrates a flow chart of example process 1300 with operations that can be performed by an electronic device, in accordance with implementations of the subject technology. For explanatory purposes, process 1300 is primarily described herein with reference to case 200 as shown in FIGS. 1-11. However, process 1300 is not limited to case 200 of FIGS. 1-11, and one or more blocks (or operations) of process 1300 can be performed by one or more other components of other suitable devices or systems. Further for explanatory purposes, some of the blocks of process 1300 are described herein as occurring in serial, or linearly. However, multiple blocks of process 1300 can occur in parallel. In addition, the blocks of process 1300 need not be performed in the order shown and/or one or more blocks of process 1300 need not be performed and/or can be replaced by other operations.

At block 1302, the electronic device can determine whether a case is present. For example, the electronic device can send a signal (e.g., via NFC coil) requesting a reply from any case nearby. Where the electronic device determines that no case is present, the electronic device can perform one or more further operations based on such a determination.

At block 1304, the electronic device can operate one or more buttons thereof. For example, where no case is present, one or more buttons of the electronic device can remain active for receiving input from a user. Such inputs can be detected at the buttons of the electronic device.

At block 1306, the electronic device can perform one or more actions associated with a button at which and user input was detected. For example, the action may include adjusting visual information presented on a display or the volume of acoustical energy output by an audio speaker.

Figure 14:
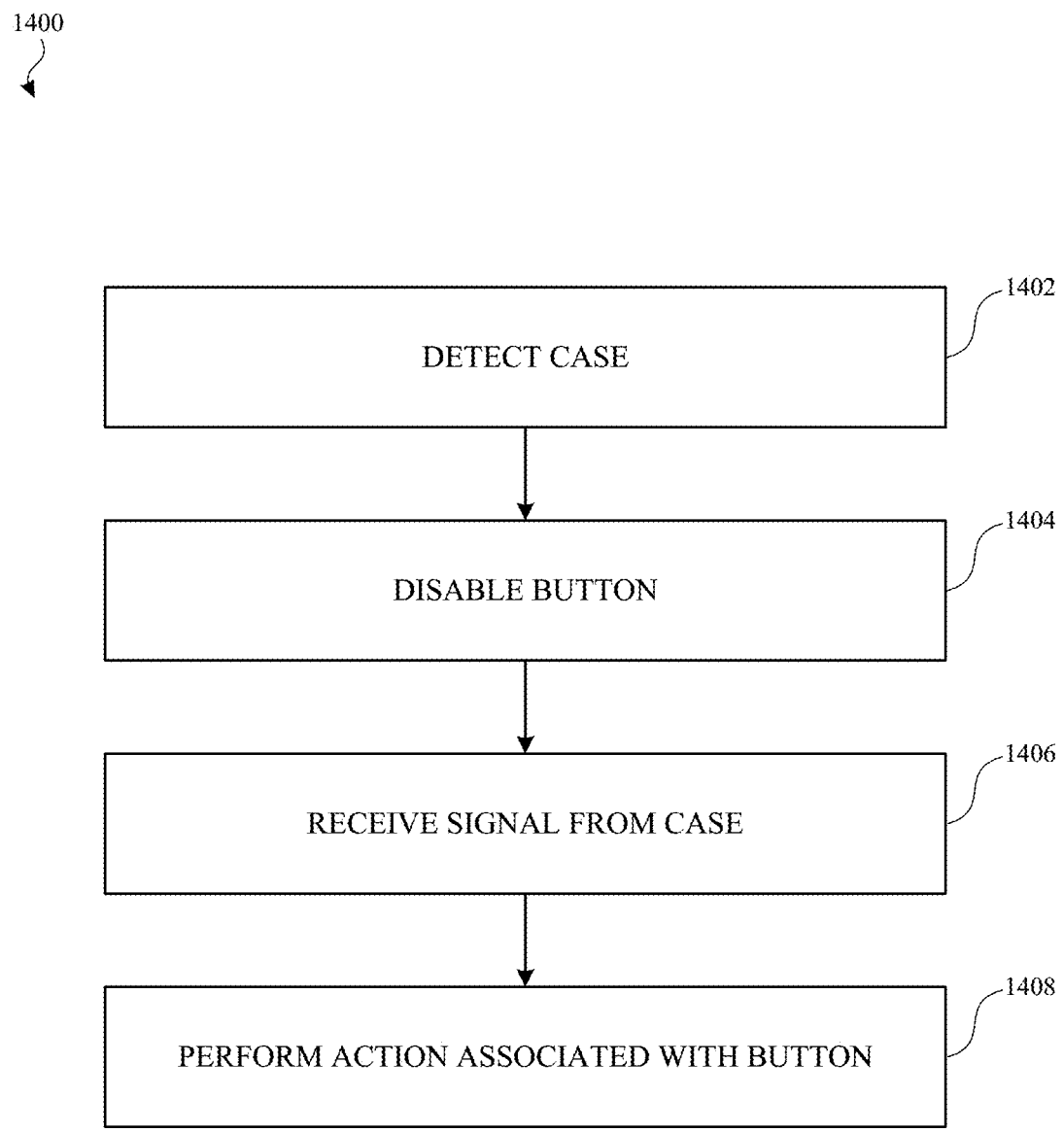
FIG. 14 illustrates a flow chart of example operations that can be performed by an electronic device, in accordance with implementations of the subject technology.

FIG. 14 illustrates a flow chart of example process 1400 with operations that can be performed by an electronic device, in accordance with implementations of the subject technology. For explanatory purposes, process 1400 is primarily described herein with reference to case 200 as shown in FIGS. 1-11. However, process 1400 is not limited to case 200 of FIGS. 1-11, and one or more blocks (or operations) of process 1400 can be performed by one or more other components of other suitable devices or systems. Further for explanatory purposes, some of the blocks of process 1400 are described herein as occurring in serial, or linearly. However, multiple blocks of process 1400 can occur in parallel. In addition, the blocks of process 1400 need not be performed in the order shown and/or one or more blocks of process 1400 need not be performed and/or can be replaced by other operations.

At block 1402, the electronic device can determine whether a case is present. For example, the electronic device can send a signal (e.g., via NFC coil) requesting a reply from any case nearby. If a case is present, the case can transmit an identification signal associated with the case to the electronic device. The identification signal can be associated with an NFC tag of the case or otherwise be used by the electronic device to identify one or more characteristics of the case, such as make, model, serial number, and the like. The electronic device can determine one or more features of the case based on the received identification signal. Where the electronic device determines that a case is present (e.g., receiving a response via the NFC coil), the electronic device can perform one or more further operations based on such a determination.

At block 1404, the electronic device can disable one or more buttons thereof. For example, where a case is present, one or more buttons of the electronic device can be disabled when they are determined to be covered by corresponding touch sensor(s) of the case. Such a determination can be based on determined features of the case based on the received identification signal. For example, the electronic device can compare a known layout of its buttons to a determined layout of the touch sensors of the case to determine whether any of the touch sensors will overlap the buttons when the case is coupled to the electronic device. Such buttons can be disabled, such that they do not detect inputs and/or any detected inputs are rejected or disregarded. Instead of operating the buttons, the electronic device can response to signals from the case corresponding to inputs received at the case.

At block 1406, the electronic device can receive a signal from a case. The signal can correspond to an input received at a touch sensor of the case. The signal can indicate one or more characteristics of the input, including the touch sensor that performed the detection, a duration of time for an input, a force or pressure, a motion (e.g., sliding gesture), a location, a fingerprint detection, and the like.

At block 1408, the electronic device can perform one or more actions associated with a button of the electronic device. In some embodiments, where the touch sensor detecting the input overlaps a button of the electronic device (e.g., a disabled button), it can be determined that the input corresponds to an action that is associated with the button, even if the button is disabled. In some embodiments, the action may include adjusting visual information presented on a display or the volume of acoustical energy output by an audio speaker. In some embodiments, where the touch sensor detecting the input does not overlap a button of the electronic device, it can be determined that the input corresponds to an action that is not associated with any button. In some embodiments, the action may include unlocking one or more features of the electronic device based on an authentication based on a detection (e.g., fingerprint detection) performed by the case.

Figure 15:
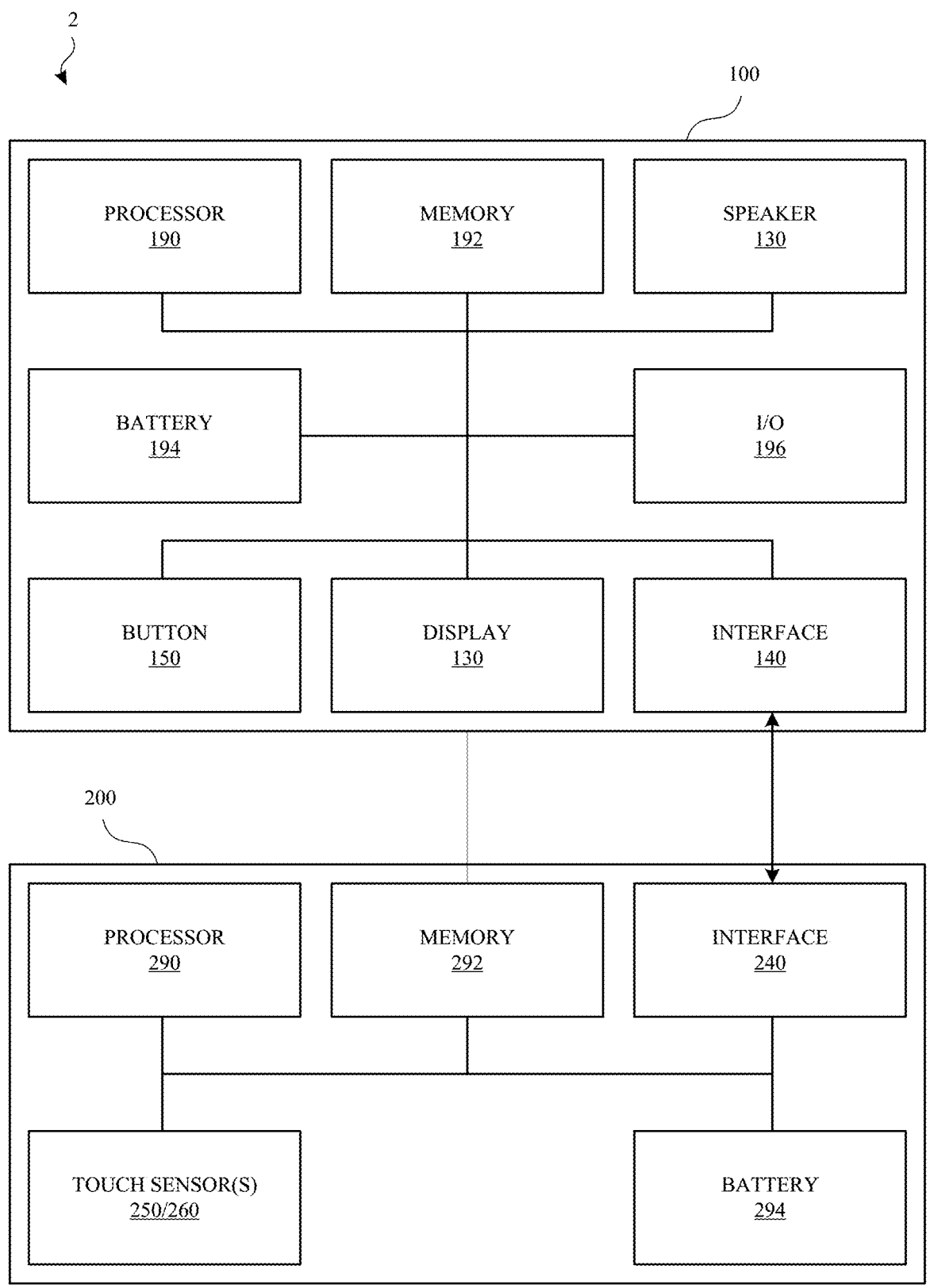
FIG. 15 illustrates a block diagram of a system including an electronic device and a case, in accordance with some embodiments of the present disclosure.

FIG. 15 illustrates a block diagram of a system 2 including an electronic device 100 and a case 200, in accordance with some embodiments of the present disclosure. It will be appreciated that components described herein can be provided on any one or more of electronic device 100 and case 200. In some embodiments, components are provided by one or some of electronic device 100 and case 200 instead of each and every one of electronic device 100 and case 200 to reduce redundancy and increase customization.

Electronic device 100 and/or case 200 can include a processor (e.g., processors 190 and/or 290) with one or more processing units that include or are configured to access a memory having instructions stored thereon. The instructions or computer programs may be configured to perform one or more of the operations or functions described with respect to the corresponding device. The processor can be implemented as any electronic device capable of processing, receiving, or transmitting data or instructions. For example, the processor may include one or more of: a microprocessor, a central processing unit (CPU), an application-specific integrated circuit (ASIC), a digital signal processor (DSP), or combinations of such devices. As described herein, the term "processor" is meant to encompass a single processor or processing unit, multiple processors, multiple processing units, or other suitably configured computing element or elements.

Electronic device 100 and/or case 200 can include a memory (e.g., memory 192 and/or 292). The memory can store electronic data that can be used by electronic device 100 and/or case 200. For example, the memory can store electrical data or content such as, for example, audio and video files, documents and applications, device settings and user preferences, timing and control signals or data for the various modules, data structures or databases, and so on. The memory can be configured as any type of memory. By way of example only, the memory can be implemented as random access memory, read-only memory, Flash memory, removable memory, or other types of storage elements, or combinations of such devices.

Electronic device 100 and/or case 200 can include a battery (e.g., battery 194 and/or 294). Such batteries can store power for use by the corresponding device and/or for transfer to another connected device.

Electronic device 100 and/or case 200 can include communication interfaces (e.g., device communication interface 140 and/or case communication interface 240). Where electronic device 100 and/or case 200 are connected with a communications interface, such devices can communicate with each other and/or one or more other devices using any suitable communications protocol. For example, device communication interface 140 and/or case communication interface 240 can include a communications interface that supports NFC, radio-frequency identification (RFID), ultra-wideband (UWB), Wi-Fi (e.g., a 802.11 protocol), Ethernet, Bluetooth, high frequency systems (e.g., 900 MHZ, 2.4 GHz, and 5.6 GHz communication systems), infrared, TCP/IP (e.g., any of the protocols used in each of the TCP/IP layers), HTTP, BitTorrent, FTP, RTP, RTSP, SSH, any other communications protocol, or any combination thereof. A communications interface can also include an antenna for transmitting and receiving electromagnetic signals. A communication interface can include physical contacts (e.g., electrically conductive contacts, electrodes, signal lines, pogo pins, wires, and the like). Such interfaces (e.g., via connectors) can transmit power, signals, commands, and the like.

Electronic device 100 can include display 130. Display 130 may include, for example, a liquid-crystal display (LCD), organic light emitting diode (OLED) display, light emitting diode (LED) display, or the like. If display 130 is an LCD, the display may also include a backlight component that can be controlled to provide variable levels of display brightness. If display 130 is an OLED or LED type display, the brightness of the display may be controlled by controlling the electrical signal that is provided to display elements.

Electronic device 100 and/or case 200 can include an input/output component (e.g., I/O component 196), which can include any suitable component for providing a user interface for operation by a user. The input/output component can include buttons, keys, touchscreens, microphones, speakers, displays, and/or another feature that can be operated by the user. The input and/or the output can be tactile, auditory, visual, and the like. The I/O component 196 can be configured to receive user input for electronic device 100. The I/O component 196 may include, for example, a touch screen, touch button, keyboard, keypad, or other touch input device. The I/O component 196 may include other input devices, including, for example, power buttons, volume buttons, home buttons, scroll wheels, and camera buttons. For example, electronic device 100 can include one or more buttons 150, as described herein. Buttons 150 can include one or more button sensors, such as a strain gauge and/or dome switch for detecting actuation of button 150 by a user.

Case 200 can include one or more touch sensors 250 and/or 260. Touch sensors 250 and/or 260 can include capacitive sensors, strain gauges, resistive touch sensors, piezoelectric sensors, optical sensors, ultrasound sensors, thermal sensors, cameras, pressure sensors, photodiodes, and/or other sensors operable to detect a user input comprising contact with touch sensors 250 and/or 260.

Accordingly, embodiments of the present disclosure provide a case for an electronic device that provides input capabilities to enhance the user experience when using the case in concert with the electronic device. For example, a case can provide an electromechanical touch sensor to provide the user with an input mechanism that does not require actuation of the button of the electronic device. The electronic device, upon detecting the presence of the case, can disable one or more buttons and perform actions corresponding to the buttons when signals are received from the case.

Various examples of aspects of the disclosure are described below as clauses for convenience. These are provided as examples, and do not limit the subject technology.

Clause A: a case for holding an electronic device, the case comprising: a rear side; a sidewall extending from a periphery of the rear side, the sidewall defining an interior cavity for receiving the electronic device, the electronic device comprising a button; an electromechanical touch sensor positioned on a portion of the sidewall to overlap the button of the electronic device when the electronic device is within the interior cavity; and a case communication interface configured to transmit a signal to the electronic device in response to a detection by the electromechanical touch sensor.

Clause B: a case for holding an electronic device, the case comprising: a body defining an interior cavity for receiving the electronic device, the electronic device comprising a first button and a second button; an electromechanical touch sensor positioned on a portion of the body to overlap each of the first button and the second button when the electronic device is within the interior cavity; and a case communication interface configured to: transmit a first signal to the electronic device in response to a detection by the electromechanical touch sensor of a first sliding input in a first direction toward the first button; and transmit a second signal to the electronic device in response to a detection by the electromechanical touch sensor of a second sliding input in a second direction toward the second button.

Clause C: a case for holding an electronic device, the case comprising: a body defining an interior cavity for receiving the electronic device and an opening positioned to overlap a button of the electronic device when the electronic device is within the interior cavity; an outer layer covering an outer side of the body and extending across the opening; an inner layer covering an inner side of the body; a touch sensor positioned on a portion of the outer layer that extends across the opening; a case communication interface within the body; and a trace operatively connecting the touch sensor to the case communication interface, at least a portion of the trace being positioned between the inner layer and the outer layer.

Clause D: an electronic device for coupling to a case, the electronic device comprising: a button configured to detect a first input at the button; a device communication interface configured to: detect the case when the electronic device is coupled to the case, the case comprising an electromechanical touch sensor positioned to overlap the button when the electronic device is coupled to the case; and receive a signal from the case, the signal corresponding to a second input received at the case; and a processor configured to: when the electronic device is not coupled to the case and when the button detects the first input at the button, perform an action associated with the button; and when the electronic device is coupled to the case, disable the button of the electronic device and perform the action associated with the button only when the signal is received from the case.

Clause E: an electronic device for coupling to a case, the electronic device comprising: a button configured to detect an input; a device communication interface configured to receive a signal from the case, the signal corresponding to another input detected by the case; and a processor configured to: when the electronic device is not coupled to the case, perform an action associated with the button in response to a detection by the button; and when the electronic device is coupled to the case, perform the action associated with the button only when the signal is received from the case.

Clause F: an electronic device for coupling to a case, the electronic device comprising: multiple buttons configured to detect inputs; a device communication interface configured to receive signals from the case, the signals corresponding to other inputs detected by the case; and a processor configured to, when the electronic device is coupled to the case: perform a first action associated with a corresponding one of the multiple buttons when a first signal is received from the case, the first signal being generated in response to a first input at a first sensor of the case that overlaps the corresponding one of the multiple buttons; and perform a second action that is not associated with any of the multiple buttons when a second signal is received from the case, the second signal being generated in response to an input at a second sensor of the case that does not overlap any of the multiple buttons.

One or more of the above clauses can include one or more of the features described below. It is noted that any of the following clauses may be combined in any combination with each other, and placed into a respective independent clause, e.g., clause A, B, C, D, E, or F.

Clause 1: the case communication interface configured to transmit the signal only when the electromechanical touch sensor detects an input that endures for a duration of time that exceeds a threshold.

Clause 2: the signal comprises a command for the electronic device to execute an action associated with the button of the electronic device.

Clause 3: the electromechanical touch sensor is further positioned to overlap an additional button of the electronic device when the electronic device is within the interior cavity.

Clause 4: the case communication interface comprises a near-field communication (NFC) coil.

Clause 5: a body defining an opening positioned to overlap the button of the electronic device when the electronic device is within the interior cavity; an outer layer covering an outer side of the body and extending across the opening; an inner layer covering an inner side of the body; and a trace operatively connecting the electromechanical touch sensor to the case communication interface, at least a portion of the trace being positioned between the inner layer and the outer layer.

Clause 6: an additional touch sensor, wherein the case communication interface is further configured to transmit an additional signal to the electronic device in response to an additional detection by the additional touch sensor, wherein the additional signal comprises an additional command for the electronic device to execute an additional action that is not associated with the button of the electronic device.

Clause 7: the additional touch sensor is a fingerprint sensor, the additional signal corresponds to an authentication of a user, and the additional action is to unlock a feature of the electronic device.

Clause 8: the case communication interface is further configured to transmit an identification signal to the electronic device, the identification signal comprising a command to disable the button of the electronic device while the case is coupled to the electronic device.

Clause 9: when the electronic device is within the interior cavity, the electromechanical touch sensor is biased against the button.

Clause 10: the first signal comprises a first command for the electronic device to execute a first action associated with the first button of the electronic device; and the second signal comprises a second command for the electronic device to execute a second action associated with the second button of the electronic device.

Clause 11: the body defines an opening positioned to overlap the first button and the second button of the electronic device when the electronic device is within the interior cavity the case further comprising: an outer layer covering an outer side of the body and extending across the opening; an inner layer covering an inner side of the body; and a trace operatively connecting the electromechanical touch sensor to the case communication interface, at least a portion of the trace being positioned between the inner layer and the outer layer.

Clause 12: the touch sensor comprises: a button cap; a substrate; an capacitive touch sensor between the button cap and the substrate; and a via extending through the substrate from the electromechanical touch sensor to the trace.

Clause 13: a mounting portion of the outer layer extending across the opening is partially recessed within the opening; and the touch sensor extends from the mounting portion of the outer layer to extend out of the opening.

Clause 14: the button comprises a strain gauge configured to generate a signal upon depression of the button.

Clause 15: the action associated with the button is to change a speaker volume setting of the electronic device.

Clause 16: the device communication interface comprises a near-field communication (NFC) coil.

Clause 17: the device communication interface is further configured to receive an identification signal from the case, the identification signal comprising a command to disable the button of the electronic device while the case is coupled to the electronic device.

Clause 18: the device communication interface is further configured to receive an authentication signal from the case, the authentication signal corresponding to an authentication of a user, and the processor is further configured to unlock a feature of the electronic device in response to the authentication signal.

Clause 19: the processor is further configured to perform the action associated with the button only when the signal is received from the case while the button detects the input.

Clause 20: each of the multiple buttons comprises a strain gauge configured to generate another signal upon depression of the corresponding one of the multiple buttons.

Clause 21: the first action associated with a first one of the multiple buttons is to increase a speaker volume setting of the electronic device; and the second action associated with a second one of the multiple buttons is to decrease the speaker volume setting of the electronic device.

Clause 22: the second signal corresponds to an authentication of a user, and the second action is to unlock a feature of the electronic device.

Clause 23: the processor is further configured to, when the electronic device is coupled to the case, disable the multiple buttons of the electronic device.

As described above, one aspect of the present technology may include the gathering and use of data available from various sources. The present disclosure contemplates that in some instances, this gathered data may include personal information data that uniquely identifies or can be used to contact or locate a specific person. Such personal information data can include demographic data, location-based data, telephone numbers, email addresses, twitter ID's, home addresses, data or records relating to a user's health or level of fitness (e.g., vital signs measurements, medication information, exercise information), date of birth, or any other identifying or personal information.

The present disclosure recognizes that the use of such personal information data, in the present technology, can be used to the benefit of users. For instance, health and fitness data may be used to provide insights into a user's general wellness, or may be used as positive feedback to individuals using technology to pursue wellness goals.

The present disclosure contemplates that the entities responsible for the collection, analysis, disclosure, transfer, storage, or other use of such personal information data will comply with well-established privacy policies and/or privacy practices. In particular, such entities should implement and consistently use privacy policies and practices that are generally recognized as meeting or exceeding industry or governmental requirements for maintaining personal information data private and secure. Such policies should be easily accessible by users, and should be updated as the collection and/or use of data changes. Personal information from users should be collected for legitimate and reasonable uses of the entity and not shared or sold outside of those legitimate uses. Further, such collection/sharing should occur after receiving the informed consent of the users. Additionally, such entities should consider taking any needed steps for safeguarding and securing access to such personal information data and ensuring that others with access to the personal information data adhere to their privacy policies and procedures. Further, such entities can subject themselves to evaluation by third parties to certify their adherence to widely accepted privacy policies and practices. In addition, policies and practices should be adapted for the particular types of personal information data being collected and/or accessed and adapted to applicable laws and standards, including jurisdiction-specific considerations. For instance, in the US, collection of or access to certain health data may be governed by federal and/or state laws, such as the Health Insurance Portability and Accountability Act (HIPAA); whereas health data in other countries may be subject to other regulations and policies and should be handled accordingly. Hence different privacy practices should be maintained for different personal data types in each country.

Despite the foregoing, the present disclosure also contemplates embodiments in which users selectively block the use of, or access to, personal information data. That is, the present disclosure contemplates that hardware and/or software elements can be provided to prevent or block access to such personal information data. For example, in the case of advertisement delivery services, the present technology can be configured to allow users to select to "opt in" or "opt out" of participation in the collection of personal information data during registration for services or anytime thereafter. In another example, users can select not to provide mood-associated data for targeted content delivery services. In yet another example, users can select to limit the length of time mood-associated data is maintained or entirely prohibit the development of a baseline mood profile. In addition to providing "opt in" and "opt out" options, the present disclosure contemplates providing notifications relating to the access or use of personal information. For instance, a user may be notified upon downloading an app that their personal information data will be accessed and then reminded again just before personal information data is accessed by the app.

Moreover, it is the intent of the present disclosure that personal information data should be managed and handled in a way to minimize risks of unintentional or unauthorized access or use. Risk can be minimized by limiting the collection of data and deleting data once it is no longer needed. In addition, and when applicable, including in certain health related applications, data de-identification can be used to protect a user's privacy. De-identification may be facilitated, when appropriate, by removing specific identifiers (e.g., date of birth, etc.), controlling the amount or specificity of data stored (e.g., collecting location data a city level rather than at an address level), controlling how data is stored (e.g., aggregating data across users), and/or other methods.

Therefore, although the present disclosure broadly covers use of personal information data to implement one or more various disclosed embodiments, the present disclosure also contemplates that the various embodiments can also be implemented without the need for accessing such personal information data. That is, the various embodiments of the present technology are not rendered inoperable due to the lack of all or a portion of such personal information data. For example, content can be selected and delivered to users by inferring preferences based on non-personal information data or a bare minimum amount of personal information, such as the content being requested by the device associated with a user, other non-personal information available to the content delivery services, or publicly available information.

A reference to an element in the singular is not intended to mean one and only one unless specifically so stated, but rather one or more. For example, "a" module may refer to one or more modules. An element proceeded by "a," "an," "the," or "said" does not, without further constraints, preclude the existence of additional same elements.

Headings and subheadings, if any, are used for convenience only and do not limit the invention. The word exemplary is used to mean serving as an example or illustration. To the extent that the term include, have, or the like is used, such term is intended to be inclusive in a manner similar to the term comprise as comprise is interpreted when employed as a transitional word in a claim. Relational terms such as first and second and the like may be used to distinguish one entity or action from another without necessarily requiring or implying any actual such relationship or order between such entities or actions.

Phrases such as an aspect, the aspect, another aspect, some aspects, one or more aspects, an implementation, the implementation, another implementation, some implementations, one or more implementations, an embodiment, the embodiment, another embodiment, some embodiments, one or more embodiments, a configuration, the configuration, another configuration, some configurations, one or more configurations, the subject technology, the disclosure, the present disclosure, other variations thereof and alike are for convenience and do not imply that a disclosure relating to such phrase(s) is essential to the subject technology or that such disclosure applies to all configurations of the subject technology. A disclosure relating to such phrase(s) may apply to all configurations, or one or more configurations. A disclosure relating to such phrase(s) may provide one or more examples. A phrase such as an aspect or some aspects may refer to one or more aspects and vice versa, and this applies similarly to other foregoing phrases.

A phrase "at least one of" preceding a series of items, with the terms "and" or "or" to separate any of the items, modifies the list as a whole, rather than each member of the list. The phrase "at least one of" does not require selection of at least one item; rather, the phrase allows a meaning that includes at least one of any one of the items, and/or at least one of any combination of the items, and/or at least one of each of the items. By way of example, each of the phrases "at least one of A, B, and C" or "at least one of A, B, or C" refers to only A, only B, or only C; any combination of A, B, and C; and/or at least one of each of A, B, and C.

It is understood that the specific order or hierarchy of steps, operations, or processes disclosed is an illustration of exemplary approaches. Unless explicitly stated otherwise, it is understood that the specific order or hierarchy of steps, operations, or processes may be performed in different order. Some of the steps, operations, or processes may be performed simultaneously. The accompanying method claims, if any, present elements of the various steps, operations or processes in a sample order, and are not meant to be limited to the specific order or hierarchy presented. These may be performed in serial, linearly, in parallel or in different order. It should be understood that the described instructions, operations, and systems can generally be integrated together in a single software/hardware product or packaged into multiple software/hardware products.

In one aspect, a term coupled or the like may refer to being directly coupled. In another aspect, a term coupled or the like may refer to being indirectly coupled.

Terms such as top, bottom, front, rear, side, horizontal, vertical, and the like refer to an arbitrary frame of reference, rather than to the ordinary gravitational frame of reference. Thus, such a term may extend upwardly, downwardly, diagonally, or horizontally in a gravitational frame of reference.

The disclosure is provided to enable any person skilled in the art to practice the various aspects described herein. In some instances, well-known structures and components are shown in block diagram form in order to avoid obscuring the concepts of the subject technology. The disclosure provides various examples of the subject technology, and the subject technology is not limited to these examples. Various modifications to these aspects will be readily apparent to those skilled in the art, and the principles described herein may be applied to other aspects.

All structural and functional equivalents to the elements of the various aspects described throughout the disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112, sixth paragraph, unless the element is expressly recited using the phrase "means for" or, in the case of a method claim, the element is recited using the phrase "step for".

The title, background, brief description of the drawings, abstract, and drawings are hereby incorporated into the disclosure and are provided as illustrative examples of the disclosure, not as restrictive descriptions. It is submitted with the understanding that they will not be used to limit the scope or meaning of the claims. In addition, in the detailed description, it can be seen that the description provides illustrative examples and the various features are grouped together in various implementations for the purpose of streamlining the disclosure. The method of disclosure is not to be interpreted as reflecting an intention that the claimed subject matter requires more features than are expressly recited in each claim. Rather, as the claims reflect, inventive subject matter lies in less than all features of a single disclosed configuration or operation. The claims are hereby incorporated into the detailed description, with each claim standing on its own as a separately claimed subject matter.

The claims are not intended to be limited to the aspects described herein, but are to be accorded the full scope consistent with the language of the claims and to encompass all legal equivalents. Notwithstanding, none of the claims are intended to embrace subject matter that fails to satisfy the requirements of the applicable patent law, nor should they be interpreted in such a way.

What is claimed is:

1. An electronic device for coupling to a case, the electronic device comprising:
   a button configured to detect a first input at the button;
   a device communication interface configured to:
      detect the case when the electronic device is coupled to the case, the case comprising an electromechanical touch sensor positioned to overlap the button when the electronic device is coupled to the case; and
      receive a signal from the case, the signal corresponding to a second input received at the case; and
   a processor configured to:

when the electronic device is not coupled to the case and when the button detects the first input at the button, perform an action associated with the button; and when the electronic device is coupled to the case, disable the button of the electronic device and perform the action associated with the button only when the signal is received from the case.

2. The electronic device of claim 1, wherein the button comprises a strain gauge configured to generate a signal upon depression of the button.

3. The electronic device of claim 1, wherein the action associated with the button is to change a speaker volume setting of the electronic device.

4. The electronic device of claim 1, wherein the device communication interface comprises a near-field communication (NFC) coil.

5. The electronic device of claim 1, wherein the device communication interface is further configured to receive an identification signal from the case, the identification signal comprising a command to disable the button of the electronic device while the case is coupled to the electronic device.

6. The electronic device of claim 1, wherein the device communication interface is further configured to receive an authentication signal from the case, the authentication signal corresponding to an authentication of a user, and the processor is further configured to unlock a feature of the electronic device in response to the authentication signal.

7. An electronic device for coupling to a case, the electronic device comprising:
a button configured to detect an input;
a device communication interface configured to receive a signal from the case, the signal corresponding to another input detected by the case; and
a processor configured to:
when the electronic device is not coupled to the case, perform an action associated with the button in response to a detection by the button; and
when the electronic device is coupled to the case, perform the action associated with the button only when the signal is received from the case.

8. The electronic device of claim 7, wherein the button comprises a strain gauge configured to generate another signal upon depression of the button.

9. The electronic device of claim 7, wherein the action associated with the button is to change a speaker volume setting of the electronic device.

10. The electronic device of claim 7, wherein the device communication interface comprises a near-field communication (NFC) coil.

11. The electronic device of claim 7, wherein the device communication interface is further configured to receive an identification signal from the case, the identification signal comprising a command to disable the button of the electronic device while the case is coupled to the electronic device.

12. The electronic device of claim 7, wherein the device communication interface is further configured to receive an authentication signal from the case, the authentication signal corresponding to an authentication of a user, and the processor is further configured to unlock a feature of the electronic device in response to the authentication signal.

13. The electronic device of claim 7, wherein the processor is further configured to perform the action associated with the button only when the signal is received from the case while the button detects the input.

14. An electronic device for coupling to a case, the electronic device comprising:
multiple buttons configured to detect inputs;
a device communication interface configured to receive signals from the case, the signals corresponding to other inputs detected by the case; and
a processor configured to, when the electronic device is coupled to the case:
perform a first action associated with a corresponding one of the multiple buttons when a first signal is received from the case, the first signal being generated in response to a first input at a first sensor of the case that overlaps the corresponding one of the multiple buttons; and
perform a second action that is not associated with any of the multiple buttons when a second signal is received from the case, the second signal being generated in response to an input at a second sensor of the case that does not overlap any of the multiple buttons.

15. The electronic device of claim 14, wherein each of the multiple buttons comprises a strain gauge configured to generate another signal upon depression of the corresponding one of the multiple buttons.

16. The electronic device of claim 14, wherein:
the first action associated with a first one of the multiple buttons is to increase a speaker volume setting of the electronic device; and
the second action associated with a second one of the multiple buttons is to decrease the speaker volume setting of the electronic device.

17. The electronic device of claim 14, wherein the device communication interface comprises a near-field communication (NFC) coil.

18. The electronic device of claim 14, wherein the device communication interface is further configured to receive an identification signal from the case, the identification signal comprising a command to disable the multiple buttons of the electronic device while the case is coupled to the electronic device.

19. The electronic device of claim 14, wherein the second signal corresponds to an authentication of a user, and the second action is to unlock a feature of the electronic device.

20. The electronic device of claim 14, wherein the processor is further configured to, when the electronic device is coupled to the case, disable the multiple buttons of the electronic device.

* * * * *